Figure 1:
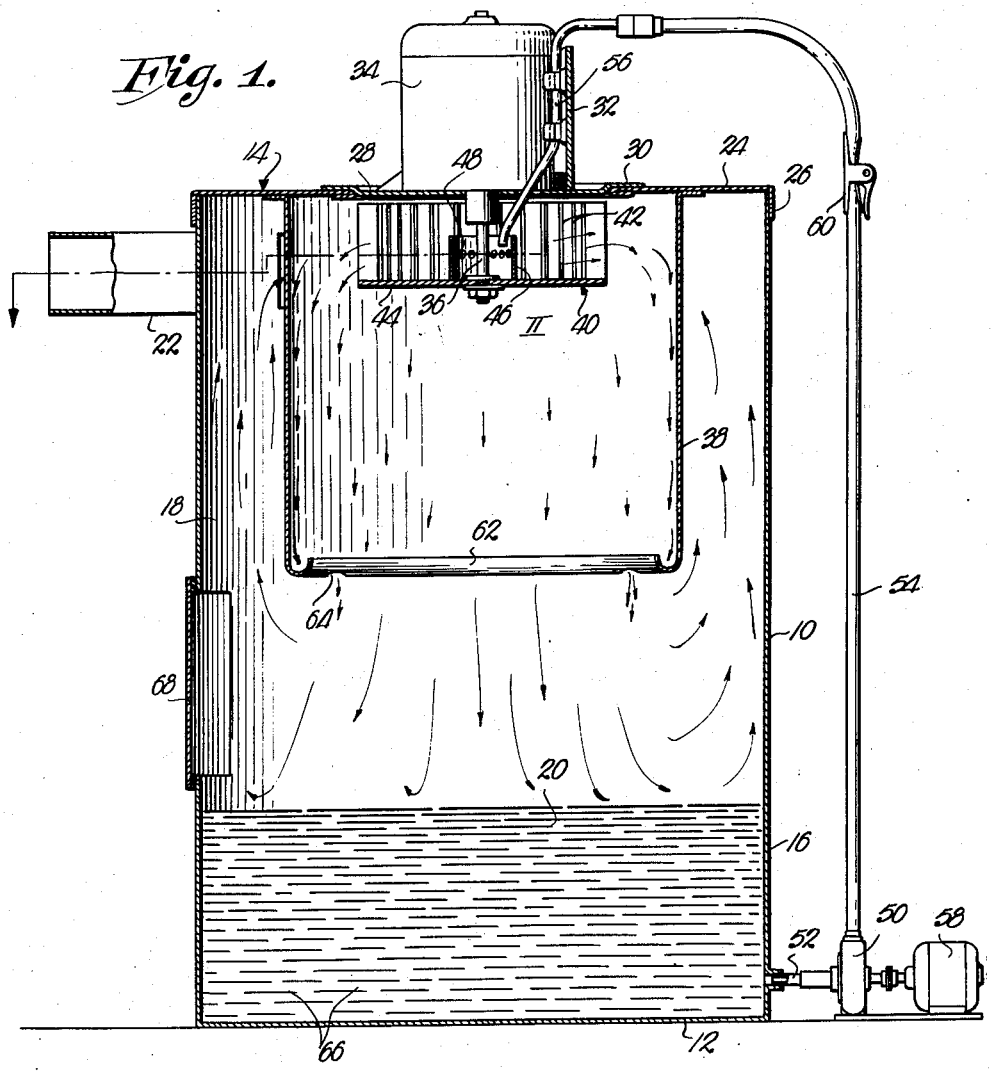

Dec. 8, 1953  J. A. DE VILBISS  2,661,936
EVAPORATIVE COOLER
Filed Aug. 20, 1952

INVENTOR.
John A. DeVilbiss
BY
ATTORNEY.

Patented Dec. 8, 1953

2,661,936

UNITED STATES PATENT OFFICE 2,661,936

EVAPORATIVE COOLER

John A. De Vilbiss, St. Marys, Kans.

Application August 20, 1952, Serial No. 305,442

5 Claims. (Cl. 261—29)

1

This invention relates to air conditioning, and more particularly to an evaporative cooling device wherein a surface of water is exposed to air currents artificially produced and wherein such water is also sprayed into the moving air and allowed to fall upon said surface, all for the purpose of continuously displacing hot, dry air entering the evaporative cooler with fresh, cool air emanating from the cooler.

It is the most important object of this invention to provide a relatively small, inexpensive cooler that may be placed in a room or other space to be air-conditioned, whereby a relatively large area may be quickly and effectively cooled without the adverse effects of drafts that normally accompany air-conditioning apparatus.

It is another important object of the present invention to provide a cooler wherein a body of water or other cooling liquid is subjected to artificial currents of air but wherein the liquid is sprayed into the air stream so that the said body of water need not be large in order to attain the cooling effect operating upon evaporative principles as desired.

Another object hereof is to provide a cooler that includes a hollow body adapted to support a fan that is disposed above the level of liquid within the body so that the artificial currents of air impinge directly upon the liquid, there being a recirculating system forming a part of the cooler to thereby insure saturation of the air with the liquid to cool the air prior to discharge from the hollow body.

Another object hereof is to provide an evaporative cooler operating upon the aforesaid principles, wherein the air is cooled appreciably prior to discharge into the space within which the cooler is disposed, and wherein the moisture is drained from the air so that the cool air is not uncomfortably moist and the humidity of the room is not appreciably raised during normal operation of the cooler.

Other objects include the way in which the recirculated liquid is directed to a fan blower for creating the artificial currents of air; the way in which the sprayed liquid is collected within the evaporator; the manner of discharging the cooled air only after the same has discharged virtually all of its liquid content; the manner of forcing the air to follow a spiral turbulent path within the cooler from the time of its inception until escape into a space being cooled; and many other objects including novel details of construction, all of which will be made clear or become apparent as the following specification progresses.

2

Figure 2:
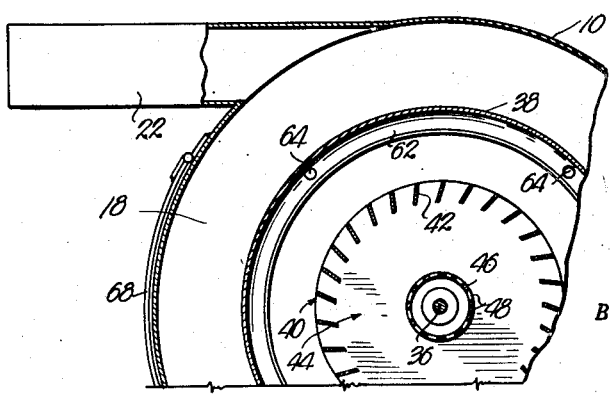

In the drawing:

Figure 1 is a vertical sectional view through an evaporative cooler made pursuant to my present invention; and Fig. 2 is a fragmentary, detailed, cross-sectional view taken on line II—II of Fig. 1.

A body broadly designated by the numeral 10, is provided with a bottom wall 12, a top wall 14, and a side wall 16 to present a hollow chamber 18 for receiving water or other liquid cooling medium 20. It is preferred that the body 10 be cylindrical and to this end, there is included outlet means adjacent the top wall 14 that consists of a tangentially disposed outlet spout or tube 22. The top wall 14 consists of a lid 24 having a continuous down-turned flange 26 surrounding the side wall 16 adjacent its uppermost open end.

Removable lid 24 has a central opening 28 that receives a removable ring support 30, carrying an upstanding bracket 32 upon which is mounted an electric motor or other prime mover 34. Shaft 36 of prime mover 34 extends downwardly through the ring support 30 into the chamber 18 and particularly into a preferably cylindrical tube 38 within the chamber 18 and depending from the lid 24 to which it is rigidly affixed. A fan blower 40 having a plurality of vanes 42 at its periphery, is mounted directly on the shaft 36 within the tube 38 directly below the top wall 14.

Fan blower 40 has a lowermost plate 44 upon which is mounted a preferably cylindrical open top cup 46 within the confines of the vanes 42, and surrounding the shaft 36. An annular row of openings 48 in the cup 46 are disposed below the uppermost edge of cup 46. Recirculating apparatus for receiving the liquid 20 from chamber 18, and directing the same to the fan blower 40 in the tube 38 and particularly to the cup 46, includes a liquid pump 50 coupled with the side wall 16 adjacent the bottom wall 12 by means of a pipe 52. The outlet of pump 50 has a flexible conduit 54 connected thereto which terminates in a pipe 56 mounted on the bracket 32 and extending downwardly through the ring support 30 into the cup 46.

The pump 50 may be driven by an electric motor 58 or other suitable prime mover. The rate of flow of liquid 20 into the cup 46 is controlled by a pincers-type clamp 60 on the conduit 54. Liquid emanating from the fan blower 40 and collecting on the inner wall of tube 38, is received by an upturned, inner annular trough 62 integral with the tube 38 at the lowermost edge thereof, and provided with a plurality of outlet openings 64.

Chunks of ice 66 in the liquid 20, may be introduced into the chamber 18 through the medium of a door 68 in the side wall 16 above the level of liquid 20 and below the lowermost open end of tube 38.

It is seen that during continuous operation of the evaporative cooler hereof, dry, hot air is pulled into the chamber 18 by the fan blower 40, through the ring-like support 30, and that artificially produced currents of air are directed radially outwardly from the shaft 36 by the vanes 42, which air impinges upon the inner side walls of the tube 38. Increased pressure within the chamber 18 and the action of the air impinging upon the level of liquid 20, as well as the evaporative action that takes place as the air moves from the fan blower 40 to the outlet 22, lowers the temperature of the air appreciably and within a short period of time the entire room within which the cooler is disposed, is pleasingly comfortable. Such out-going air is not moist since the liquid is first collected by the trough 62, and additional liquid is drained from the air for gravitation toward the bottom of the body 10 prior to discharge from outlet 22. The recirculating liquid accumulates in the cup 46 until the height of openings 48 is reached, whereupon such liquid is sprayed outwardly by centrifugal force from the openings 48 to the vanes 42. It is particularly notable that the air within chamber 18 rotates spirally, not only within tube 38, but against the inner faces of the side walls 16. Such turbulence increases the evaporative action and, therefore, the capacity of the cooler for conditioning a relatively large space, notwithstanding the small dimensions of the cooler itself. The electric motor 34 is disposed outside of the body 10 and therefore, is not subjected to deleterious effects of moisture.

While details of construction may vary, it is desired to be limited only by the spirit of the invention as defined by the scope of the appended claims.

Having thus described the invention what is claimed as new and desired to be secured by Letters Patent is:

1. In combination with structure having a bottom wall, top wall, and side wall, presenting a hollow chamber adapted to contain a liquid cooling medium, said side wall having outlet means adjacent the top wall; an open bottom tube in the chamber, depending from said top wall; a rotatable fan blower in the tube having a vertical shaft, an open top cup surrounding the shaft, and a plurality of vanes around the cup; and recirculating apparatus for receiving the liquid from the chamber near said bottom wall and directing the same into said cup.

2. In combination with structure having a bottom wall, top wall, and side wall, presenting a hollow chamber adapted to contain a liquid cooling medium, said side wall having outlet means adjacent the top wall; an open bottom tube in the chamber, depending from said top wall; a rotatable fan blower in the tube having a vertical shaft, an open top cup surrounding the shaft, and provided with a plurality of liquid outlet openings spaced below the open top thereof, and a plurality of vanes around the cup; and recirculating apparatus for receiving the liquid from the chamber near said bottom wall and directing the same into said cup.

3. In combination with structure having a bottom wall, top wall, and side wall, presenting a hollow chamber adapted to contain a liquid cooling medium, said side wall having outlet means adjacent the top wall; an open bottom tube in the chamber, depending from said top wall; a rotatable fan blower in the tube having a vertical shaft, an open top cup surrounding the shaft, and provided with a plurality of liquid outlet openings spaced below the open top thereof, and a plurality of vanes around the cup; and recirculating apparatus for receiving the liquid from the chamber near said bottom wall and directing the same into said cup, said tube having an internal, perforated, liquid-receiving trough adjacent the open bottom thereof.

4. In the invention as set forth in claim 3 wherein said top wall consists of a lid provided with a central opening, there being a ring support in said central opening, and a prime mover mounted upon the ring support, said shaft forming a part of the prime mover and extending downwardly therefrom through the ring.

5. In the invention as set forth in claim 4 wherein the internal diameter of the tube is appreciably greater than the fan and the external diameter thereof is appreciably less than the side wall, said open bottom of the tube being above the level of liquid in the chamber.

JOHN A. DE VILBISS.

References Cited in the file of this patent

UNITED STATES PATENTS

| Number | Name | Date |
|---|---|---|
| 1,950,347 | Williams | Mar. 6, 1934 |
| 2,053,387 | Williams | Sept. 8, 1936 |
| 2,396,526 | Nilsson | Mar. 12, 1946 |